(12) United States Patent
Liu et al.

(10) Patent No.: US 8,886,575 B1
(45) Date of Patent: Nov. 11, 2014

(54) SELECTING AN ALGORITHM FOR IDENTIFYING SIMILAR USER IDENTIFIERS BASED ON PREDICTED CLICK-THROUGH-RATE

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/534,480

(22) Filed: Jun. 27, 2012

(51) Int. Cl.
*G06F 15/18* (2006.01)

(52) U.S. Cl.
USPC .......................................................... 706/12

(58) Field of Classification Search
USPC .................................................. 706/12, 45
See application file for complete search history.

(56) References Cited

U.S. PATENT DOCUMENTS

| | | | |
|---|---|---|---|
| 5,901,255 A | 5/1999 | Yagasaki | |
| 5,974,398 A | 10/1999 | Hanson et al. | |
| 6,185,514 B1 | 2/2001 | Skinner et al. | |
| 6,266,649 B1 | 7/2001 | Linden et al. | |
| 6,269,351 B1 | 7/2001 | Black | |
| 6,295,504 B1 | 9/2001 | Ye et al. | |
| 6,487,538 B1 | 11/2002 | Gupta et al. | |
| 6,539,375 B2 | 3/2003 | Kawasaki | |
| 6,560,578 B2 | 5/2003 | Eldering | |
| 6,567,797 B1 | 5/2003 | Schuetze et al. | |
| 6,581,058 B1 | 6/2003 | Fayyad et al. | |
| 6,598,054 B2 | 7/2003 | Schuetze et al. | |
| 6,973,436 B1 | 12/2005 | Shkedi | |
| 6,982,726 B1 | 1/2006 | Berestov | |
| 7,003,566 B2 | 2/2006 | Codella et al. | |
| 7,103,584 B2 | 9/2006 | Lee | |
| 7,202,791 B2 | 4/2007 | Trajkovic | |
| 7,203,909 B1 | 4/2007 | Horvitz et al. | |
| 7,257,546 B2 | 8/2007 | Ebrahimi et al. | |
| 7,272,065 B2 | 9/2007 | Lovett | |
| 7,454,705 B2 | 11/2008 | Cadez et al. | |
| 7,685,278 B2 | 3/2010 | Cohen et al. | |
| 7,693,836 B2 | 4/2010 | Brave et al. | |

(Continued)

OTHER PUBLICATIONS

U.S. Appl. No. 13/362,671, filed Jan. 31, 2012, Jia Liu et al.

(Continued)

*Primary Examiner* — David Vincent
(74) *Attorney, Agent, or Firm* — Foley & Lardner LLP; John D. Lanza

(57) ABSTRACT

A computerized method, system for, and computer-readable medium operable to select an algorithm for generating models configured to identify similar user identifiers. A first plurality of models generated by a first algorithm is received. A plurality of lists of similar user identifiers is generated. User queries associated with user identifiers on the plurality of lists of similar user identifiers are identified. Predicted click-through rates for the user queries is received. An average predicted click-through rate is computed for each model based on the predicted click-through rates. A weighted average predicted click-through rate associated with the first plurality of models is computed. The weighted average predicted click-through rate for the first plurality of models can be compared to a weighted average predicted click-through rate for a second plurality of models generated by a second algorithm. The algorithm for generating models is selected based on the comparison.

21 Claims, 6 Drawing Sheets

(56) References Cited

U.S. PATENT DOCUMENTS

| | | | |
|---|---|---|---|
| 7,693,863 | B2 | 4/2010 | Martin et al. |
| 7,711,735 | B2 | 5/2010 | Wu et al. |
| 7,734,632 | B2 | 6/2010 | Wang |
| 7,739,314 | B2 | 6/2010 | Datar et al. |
| 7,769,786 | B2 | 8/2010 | Patel |
| 7,809,740 | B2 | 10/2010 | Chung et al. |
| 7,822,636 | B1 | 10/2010 | Ferber et al. |
| 7,882,175 | B1 | 2/2011 | Nayfeh et al. |
| 7,904,448 | B2 | 3/2011 | Chung et al. |
| 7,908,238 | B1* | 3/2011 | Nolet et al. .................. 706/52 |
| 8,026,944 | B1 | 9/2011 | Sah |
| 8,027,964 | B2 | 9/2011 | Boulis |
| 8,095,484 | B2 | 1/2012 | Cheng et al. |
| 8,095,523 | B2 | 1/2012 | Brave et al. |
| 8,117,211 | B2 | 2/2012 | Yamamoto et al. |
| 8,131,733 | B2 | 3/2012 | Wang |
| 8,260,656 | B1 | 9/2012 | Harbick et al. |
| 8,321,934 | B1 | 11/2012 | Cooley et al. |
| 8,370,321 | B2 | 2/2013 | Chu et al. |
| 8,527,526 | B1 | 9/2013 | Liu et al. |
| 8,566,422 | B2 | 10/2013 | Johnson et al. |
| 8,768,867 | B1 | 7/2014 | Thaeler et al. |
| 2003/0033196 | A1 | 2/2003 | Tomlin |
| 2003/0033336 | A1 | 2/2003 | Gremmert |
| 2003/0220975 | A1 | 11/2003 | Malik |
| 2004/0030667 | A1 | 2/2004 | Xu et al. |
| 2004/0090472 | A1 | 5/2004 | Risch et al. |
| 2004/0215509 | A1 | 10/2004 | Perry |
| 2005/0049907 | A1 | 3/2005 | Kumar et al. |
| 2005/0086105 | A1 | 4/2005 | McFadden et al. |
| 2006/0015487 | A1 | 1/2006 | Vest |
| 2006/0026062 | A1 | 2/2006 | Collins |
| 2006/0059144 | A1 | 3/2006 | Canright et al. |
| 2006/0064411 | A1 | 3/2006 | Gross et al. |
| 2006/0069612 | A1 | 3/2006 | Hurt et al. |
| 2006/0069616 | A1 | 3/2006 | Bau |
| 2006/0136294 | A1 | 6/2006 | Linden et al. |
| 2006/0241923 | A1 | 10/2006 | Xu et al. |
| 2006/0248035 | A1* | 11/2006 | Gendler et al. .................. 707/1 |
| 2007/0061195 | A1 | 3/2007 | Liu et al. |
| 2007/0067297 | A1 | 3/2007 | Kublickis |
| 2007/0073579 | A1 | 3/2007 | Immorlica et al. |
| 2007/0130005 | A1 | 6/2007 | Jaschke |
| 2007/0156458 | A1 | 7/2007 | Benja-Athon et al. |
| 2007/0156519 | A1 | 7/2007 | Agassi et al. |
| 2007/0179846 | A1 | 8/2007 | Jain et al. |
| 2007/0233556 | A1 | 10/2007 | Koningstein |
| 2008/0071929 | A1 | 3/2008 | Motte et al. |
| 2008/0108308 | A1 | 5/2008 | Ullah |
| 2008/0126176 | A1 | 5/2008 | Iguchi |
| 2008/0140524 | A1 | 6/2008 | Anand et al. |
| 2008/0147659 | A1 | 6/2008 | Chen et al. |
| 2008/0154717 | A1 | 6/2008 | Saifee et al. |
| 2008/0189174 | A1 | 8/2008 | Moore |
| 2008/0201216 | A1 | 8/2008 | Almeida |
| 2008/0215348 | A1 | 9/2008 | Guldimann et al. |
| 2008/0294584 | A1 | 11/2008 | Herz |
| 2008/0300958 | A1 | 12/2008 | Gluck |
| 2009/0006974 | A1 | 1/2009 | Harinarayan et al. |
| 2009/0012852 | A1 | 1/2009 | O'Kelley et al. |
| 2009/0048925 | A1 | 2/2009 | Song et al. |
| 2009/0077495 | A1 | 3/2009 | Bhat et al. |
| 2009/0164274 | A1 | 6/2009 | Narayanaswamy et al. |
| 2009/0164395 | A1 | 6/2009 | Heck |
| 2009/0222734 | A1 | 9/2009 | Fuller et al. |
| 2009/0228397 | A1 | 9/2009 | Tawakol et al. |
| 2009/0248494 | A1 | 10/2009 | Hueter et al. |
| 2009/0265243 | A1 | 10/2009 | Karassner et al. |
| 2009/0281923 | A1 | 11/2009 | Selinger et al. |
| 2009/0292386 | A1 | 11/2009 | Cheng et al. |
| 2009/0327032 | A1 | 12/2009 | Gunawardana et al. |
| 2010/0004975 | A1 | 1/2010 | White et al. |
| 2010/0042500 | A1 | 2/2010 | Pritchard et al. |
| 2010/0042502 | A1 | 2/2010 | Farmanfarmaian et al. |
| 2010/0082421 | A1 | 4/2010 | Tuladhar et al. |
| 2010/0121671 | A1* | 5/2010 | Boutilier et al. .................. 705/8 |
| 2010/0121850 | A1 | 5/2010 | Moitra et al. |
| 2010/0131835 | A1 | 5/2010 | Kumar et al. |
| 2010/0138291 | A1 | 6/2010 | Silverman et al. |
| 2010/0169342 | A1 | 7/2010 | Kenedy et al. |
| 2010/0217648 | A1 | 8/2010 | Agarwal et al. |
| 2010/0228614 | A1 | 9/2010 | Zhang et al. |
| 2010/0235241 | A1 | 9/2010 | Wang et al. |
| 2010/0250558 | A1 | 9/2010 | Wang |
| 2010/0274753 | A1 | 10/2010 | Liberty et al. |
| 2010/0293057 | A1 | 11/2010 | Haveliwala et al. |
| 2010/0318374 | A1 | 12/2010 | Flake et al. |
| 2010/0325666 | A1 | 12/2010 | Wiser et al. |
| 2011/0010324 | A1 | 1/2011 | Bolivar et al. |
| 2011/0055008 | A1 | 3/2011 | Feuerstein et al. |
| 2011/0055012 | A1 | 3/2011 | Christianson et al. |
| 2011/0071900 | A1 | 3/2011 | Kamath et al. |
| 2011/0077998 | A1 | 3/2011 | Yan et al. |
| 2011/0106796 | A1 | 5/2011 | Svaic |
| 2011/0145248 | A1 | 6/2011 | Doliov |
| 2011/0153423 | A1 | 6/2011 | Elvekrog et al. |
| 2011/0166926 | A1 | 7/2011 | Lv et al. |
| 2011/0173198 | A1 | 7/2011 | Malleshaiah et al. |
| 2011/0191176 | A1 | 8/2011 | Merriman et al. |
| 2011/0191714 | A1 | 8/2011 | Ting et al. |
| 2011/0225608 | A1 | 9/2011 | Lopatecki et al. |
| 2011/0231241 | A1 | 9/2011 | Kesari et al. |
| 2011/0231257 | A1 | 9/2011 | Winters |
| 2011/0231264 | A1 | 9/2011 | Dilling et al. |
| 2011/0246267 | A1 | 10/2011 | Williams et al. |
| 2011/0258039 | A1 | 10/2011 | Patwa et al. |
| 2011/0264522 | A1 | 10/2011 | Chan et al. |
| 2011/0270560 | A1 | 11/2011 | Wang et al. |
| 2011/0288937 | A1 | 11/2011 | Manoogian et al. |
| 2012/0010939 | A1 | 1/2012 | Krishnamoorthy et al. |
| 2012/0047013 | A1 | 2/2012 | Bigby et al. |
| 2012/0047022 | A1 | 2/2012 | Shamim et al. |
| 2012/0047132 | A1 | 2/2012 | Fleming et al. |
| 2012/0059707 | A1 | 3/2012 | Goenka et al. |
| 2012/0166530 | A1 | 6/2012 | Tseng |
| 2012/0179543 | A1 | 7/2012 | Luo et al. |
| 2012/0209568 | A1 | 8/2012 | Arndt et al. |
| 2012/0239506 | A1 | 9/2012 | Saunders et al. |
| 2012/0253928 | A1 | 10/2012 | Jackson et al. |
| 2012/0271782 | A1 | 10/2012 | Blowers et al. |
| 2012/0316972 | A1 | 12/2012 | Hu et al. |
| 2013/0006778 | A1 | 1/2013 | Raghunandan |
| 2013/0047076 | A1 | 2/2013 | McElfresh et al. |
| 2013/0054628 | A1 | 2/2013 | Meierhoefer et al. |
| 2013/0124259 | A1 | 5/2013 | Chourey et al. |
| 2013/0124298 | A1 | 5/2013 | Li et al. |
| 2013/0132415 | A1 | 5/2013 | Adams |
| 2013/0151312 | A1 | 6/2013 | Logan |
| 2013/0346182 | A1* | 12/2013 | Cheng et al. ............... 705/14.41 |

OTHER PUBLICATIONS

U.S. Appl. No. 13/362,797, filed Jan. 31, 2012, Jia Liu et al.
U.S. Appl. No. 13/362,910, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012, Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
"Clustering II" Powerpoint, EECS435, Spring 2008, 25 pages.
Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.

(56) References Cited

OTHER PUBLICATIONS

Johnson, Mark; "Confidence Intervals on Likelihood Estimates for Estimating Association Strengths", Brown University, Draft of May 28, 1999, 7 pages.
Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
Notice of Allowance on U.S. Appl. No. 13/551,236 dated May 22, 2014.
U.S. Appl. No. 13/550,073, filed Jul. 16, 2012, Jia Liu et al.
U.S. Appl. No. 13/551,236, filed Jul. 17, 2012, Jia Liu et al.
Notice of Allowance on U.S. Appl. No. 13/462,130 dated Apr. 22, 2013.
Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/550,073 dated Jun. 3, 2013.
U.S. Appl. No. 13/598,331, filed Aug. 29, 2012, Zhang et al.
U.S. Appl. No. 13/601,775, filed Aug. 31, 2012, Jia Liu et al.
U.S. Appl. No. 13/602,059, filed Aug. 31, 2012, Jia Liu et al.
Notice of Allowance on U.S. Appl. No. 13/551,236 dated Jan. 30, 2014.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/363,356 dated Mar. 14, 2014.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Office Action on U.S. Appl. No. 13/550,073 dated Oct. 22, 2013.
Office Action on U.S. Appl. No. 13/550,073 dated Feb. 10, 2014.
US Non Final OA on U.S. Appl. No. 13/363,353 dated Apr. 22, 2014.
US Non Final Office Action on U.S. Appl. No. 13/465,679 dated Apr. 14, 2014.
US Notice of Allowance on U.S. Appl. No. 13/598,331 dated Mar. 20, 2014.
US Office Action on U.S. Appl. No. 13/362,910 dated Apr. 8, 2014.
Office Action on U.S. Appl. No. 13/460,411 dated Jul. 15, 2014.
U.S. Notice of Allowance on U.S. Appl. No. 13/550,073 dated Jun. 27, 2014.
U.S. Office Action on U.S. Appl. No. 13/362,671 dated Jun. 30, 2014.

\* cited by examiner

US 8,886,575 B1

SELECTING AN ALGORITHM FOR IDENTIFYING SIMILAR USER IDENTIFIERS BASED ON PREDICTED CLICK-THROUGH-RATE

BACKGROUND

The present disclosure relates generally to similar user identifiers.

From a content provider's perspective, placing content such as a content on a web page may or may not be of interest or useful for the end users viewing the web page. In some systems, the content of a web page may be used to help select more relevant content to be provided with the web page. For example, a retailer or manufacturer selling golf clubs may place content on a website devoted to golf, since visitors to the website may share a common interest in golf. Such systems may use keywords located in the text of the website to identify topics discussed on the website.

SUMMARY

A computerized method, system for, and computer-readable medium operable to select an algorithm for generating models configured to identify similar user identifiers. A first plurality of models generated by a first algorithm is received. A plurality of lists of similar user identifiers is generated. Each list of similar user identifiers corresponds to one of the first plurality of models. User queries associated with user identifiers on the plurality of lists of similar user identifiers are identified. Predicted click-through rates for the user queries is received. An average predicted click-through rate is computed for each model based on the predicted click-through rates. A weighted average predicted click-through rate associated with the first plurality of models is computed. The weighted average predicted click-through rate for the first plurality of models can be compared to a weighted average predicted click-through rate for a second plurality of models generated by a second algorithm. The algorithm for generating models configured to identify similar user identifiers is selected based on the weighted average predicted click-through rates.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

Figure 1:
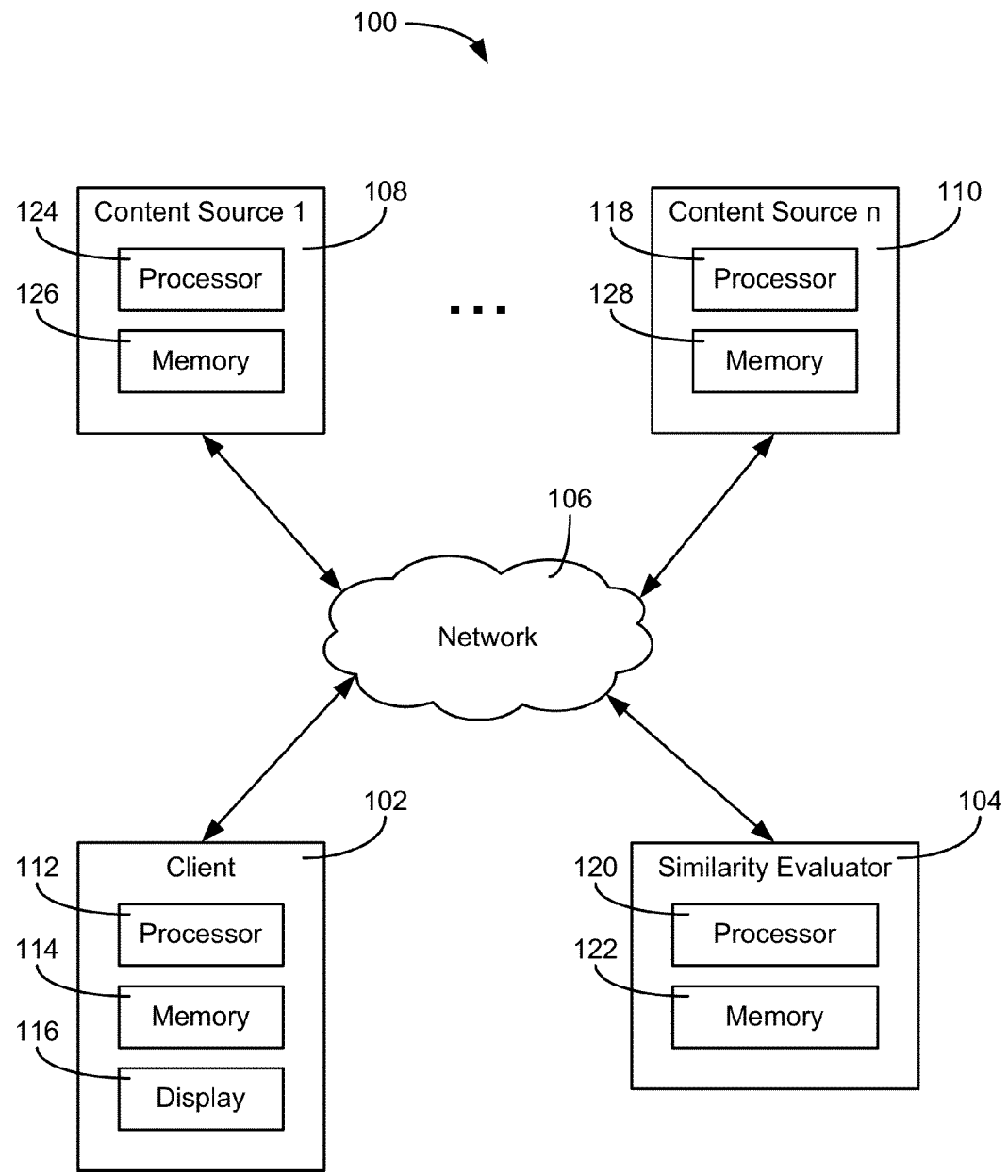
FIG. 1 is a block diagram of a computer system in accordance with a described implementation.

According to some aspects of the present disclosure, the online behaviors of user identifiers may be used to provide an audience-based approach to providing relevant content. As used herein, online behavior refers to how a user identifier interacts with web pages on the Internet (e.g., which web pages are visited, the order in which the web pages are visited, how long a particular webpage is viewed, and similar information). In some implementations, a set of user identifiers associated with an online event (e.g., making an online purchase, being added to a content provider's list of user identifiers, etc.) may be used as a basis to determine user identifiers having similar online behaviors.

A user may opt in or out of allowing a content server to identify and store information about the user and/or about devices operated by the user. For example, the user may opt in to receiving content from the content server that may be more relevant to the user. In some implementations, the user may be represented as an anonymous user identifier (e.g., a cookie, a device serial number, etc.) that contains no personally-identifiable information about the user. For example, information relating to the user's name, demographics, etc., may not be used by the content server unless the user opts in to providing such information. Thus, the user may have control over how information is collected about him or her and used by a content server.

In a content-based approach to providing relevant content, content is provided based on the subject matter of a web page. For example, a web page devoted to golf may mention the terms "golf" and other golf-related terms. A content server that places content on the web page may use the subject matter of the webpage itself and/or terms provided as part of a request for content (e.g., via a content tag embedded into the code of the webpage), to determine a theme for the web page. Based on the determined theme, a manufacturer of golf clubs may opt to place content on the web page.

An audience-based approach to providing relevant content, in contrast to the content-based approach, involves selecting content based on the user identifier visiting a web page, instead of the subject matter of the web page itself. For example, a user identifier may be associated with making an online reservation at a golf resort and navigating to a financial web page to check the stock market. Based on golf being a potential interest category associated with the user identifier, for example, content from a manufacturer of golf clubs may be provided with the financial web page, even though the financial web page is unrelated to golf.

A content server may use the content-based approach, the audience-based approach, or a combination of the content-based approach and the audience-based approach to provide relevant content to users.

One or more implementations described herein provides a method that allows a processing circuit to select an algorithm for generating models configured to identify similar user identifiers. The identification process can be evaluated by comparing a weighted average predicted click-through rate of a set of models generated by one algorithm with a weighted averaged predicted click-through rate of a set of models generated by another algorithm. By evaluating the identification process using a predicted click-through rate, instead of an actual click-through rate, a content server may acquire more information about the success of the identification process of various algorithms. Specifically, when using the actual click-through rate, content, such as an advertisement, selected to be displayed to similar user identifiers must compete with content from other targeting criteria because only a limited quantity of content are displayed to a user identifier. The predicted click-through rate does not require the content to be displayed to the similar user identifiers or to be clicked on by the similar user identifiers. Therefore, information about the success of the identification process can be acquired without having to beat other content in an auction process.

Referring to FIG. 1, a block diagram of a computer system 100 in accordance with a described implementation is shown. System 100 includes a client 102 which communicates with other computing devices via a network 106. Client 102 may execute a web browser or other application (e.g., a video game, a messaging program, etc.) to retrieve content from other devices over network 106. For example, client 102 may communicate with any number of content sources 108, 110 (e.g., a first content source through nth content source), which provide electronic content to client 102, such as web page data and/or other content (e.g., text documents, PDF files, and other forms of electronic documents). In some implementations, computer system 100 may also include a similarity evaluator 104 configured to identify one or more similar user identifiers to those of a set of one or more other user identifiers. For example, a user identifier associated with client 102 may be identified as having similar characteristics as that of a set of other user identifiers. In such a case, similarity evaluator 104 may provide data to content sources 108, 110 that is used by content source 108, 110 to select relevant content for client 102. In other implementations, similarity evaluator 104 may itself select relevant content for client 102 based on the user identifier associated with client 102.

Network 106 may be any form of computer network that relays information between client 102, content sources 108, 110, and similarity evaluator 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays web pages and other forms of content received from content sources 108, 110 and/or similarity evaluator 104.

Content sources 108, 110 may be one or more electronic devices connected to network 106 that provide content to client 102. For example, content sources 108, 110 may be computer servers (e.g., FTP servers, file sharing servers, web servers, etc.) or combinations of servers (e.g., data centers, cloud computing platforms, etc.). Content may include, but is not limited to, web page data, a text file, a spreadsheet, an image file, and other forms of electronic documents. Similar to client 102, content sources 108, 110 may include processing circuits comprising processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Similarity evaluator 104 may be one or more electronic devices connected to network 106 and configured to determine the similarity between a client identifier associated with client 102 and one or more other client identifiers. Similarity evaluator 104 may be a computer server (e.g., FTP servers, file sharing servers, web servers, etc.) or a combination of servers (e.g., a data center, a cloud computing platform, etc.). Similarity evaluator 104 may include a processing circuit including a processor 120 and a memory 122 that stores program instructions executable by processor 120. In cases in which similarity evaluator 104 is a combination of computing devices, processor 120 may represent the collective processors of the devices and memory 122 may represent the collective memories of the devices. In other implementations, the functionality of similarity evaluator 104 may be integrated into content sources 108, 110 or other devices connected to network 106.

Similarity evaluator 104 may store user identifiers to represent users of computing system 100. A user identifier may be associated with one or more client identifiers. For example, a user identifier may be associated with the network address of client 102 or a cookie that has been set on client 102. A user identifier may be associated with any number of different client identifiers. For example, a user identifier may be associated with a device identifier for client 102 and another client device connected to network 106. In other implementations, a device identifier for client 102 may itself be used in computing system 100 as a user identifier.

A user of client 102 may opt in or out of allowing similarity evaluator 104 to identify and store data relating to client 102 and the user. For example, the user may opt in to receiving content selected by similarity evaluator 104 that may be more relevant to him or her. In one implementation, a client identifier and/or device identifier for client 102 may be randomized and contain no personally-identifiable information about the user of client 102. Thus, the user of client 102 may have control over how information is collected about the user and used by similarity evaluator 104, in various implementations.

In cases in which the user of client 102 opts in to receiving more relevant content, similarity evaluator 104 may determine a similarity score based on how similar a user identifier associated with client 102 is to that of a set of one or more other user identifiers. In some implementations, a similarity score may be determined by similarity evaluator 104 by analyzing signals associated with the set of user identifiers. In general, any data indicative of an online action associated with a user identifier may be used as a signal by similarity evaluator 104. For example, a signal associated with a user identifier may be indicative of visiting a particular web page or website, selecting content, receiving content related to a particular topic, etc. Signals may be stored by similarity evaluator 104 in memory 122 and retrieved by processor 120 to generate similarity scores. In some implementations, signals may be received by similarity evaluator 104 from content sources 108, 110. For example, content source 108 may provide data to similarity evaluator 104 regarding client 102 visiting a web page that is served by content source 108. In further implementations, data regarding online actions associated with client 102 may be provided by client 102 to similarity evaluator 104.

In some implementations, a client device that uses network 106 may provide data regarding an online action to similarity evaluator 104 in response to executing a content tag that is part of a web page from content sources 108, 110. A content tag refers to any piece of web page code associated with or including additional content in conjunction with the web page. For example, a content tag may define a slot on a web page for additional content, a slot for off page content (e.g., interstitial content), whether content should be loaded asynchronously or synchronously, whether the loading of content should be disabled on the web page, whether content that loaded unsuccessfully should be refreshed, the network location of a content source that provides the content (e.g., content sources 108, 110, similarity evaluator 104, etc.), a network location (e.g., a URL) associated with selecting the content (e.g., by clicking on the content, highlighting the content, etc.), how the content is to be rendered on a display, one or more keywords used to retrieve the content, and other functions associated with providing additional content in conjunction with a web page. For example, content source 108 may provide web page data that causes client 102 to contact similarity evaluator 104 when the web page is loaded by client 102. In this way, similarity evaluator 104 may store signal data regarding the visit by client 102 to the web page (e.g., an identifier for the visited web page, an access time for the visited web page, a topic of the web page, etc.).

A set of one or more user identifiers may be evaluated by similarity evaluator 104 to determine how strongly a particular signal relates to the user identifiers in the set. The set may be selected randomly or based on one or more characteristics of the set. For example, the set may be selected for evaluation based on geographic data associated with the set (e.g., user identifiers associated with a particular geographic region), based on one or more signals associated with the identifiers (e.g., user identifiers associated with reviewing content about a certain topic), any other characteristic, or a combination thereof. In some implementations, similarity evaluator 104 may determine the strength of association between a signal and the set using a statistical measure of association. For example, similarity evaluator 104 may determine the strength of association between the set and a particular signal using a point-wise mutual information (PMI) score, a term-frequency inverse-document-frequency (TF-IDF) score, a mutual information score, a Kullback-Leibler divergence score, any other statistical measure of association, or combinations thereof.

In some implementations, similarity evaluator 104 may use signal strength scores to determine the similarity between a user identifier associated with client 102 and that of a set of one or more other user identifiers. In some cases, signals associated with the user identifier may be weighted using the signal strength scores determined by analyzing the set of user identifiers. For example, assume that the set of user identifiers are associated with purchasing a particular product from an online retailer. In such a case, a signal indicative of researching the product may have a high strength score. If the user identifier for client 102 is also associated with this signal, the user identifier may be given a high similarity score in relation to the set by similarity evaluator 104.

A similarity score for a user identifier may be used by similarity evaluator 104, content sources 108, 110, or another computing device connected to network 106 to select relevant content for client 102. In one implementation, similarity evaluator 104 may conduct a content auction in which content providers compete to provide content to client 102. For example, assume that the user identifier associated with client 102 is determined to be similar to a set of user identifiers that purchased golf clubs. In such a case, an online retailer that sells golf clubs may bid in a content auction to provide content in conjunction with a web page being visited by client 102. In some implementations, similarity evaluator 104 may determine a bid on behalf of the content provider based on the similarity score, when similarity evaluator 104 selects content for client 102.

Relevant content may be provided to client 102 by content sources 108, 110 or similarity evaluator 104. For example, similarity evaluator 104 may select relevant content from content source 110 to be included with a web page served by content source 108. In another example, similarity evaluator 104 may provide the selected content to client 102. In some implementations, similarity evaluator 104 may select content stored in memory 114 of client 102. For example, previously provided content may be cached in memory 114, content may be preloaded into memory 114 (e.g., as part of the installation of an application), or may exist as part of the operating system of client 102. In such a case, similarity evaluator 104 may provide an indication of the selection to client 102. In response, client 102 may retrieve the selected content from memory 114 and display it on display 116.

Figure 2:
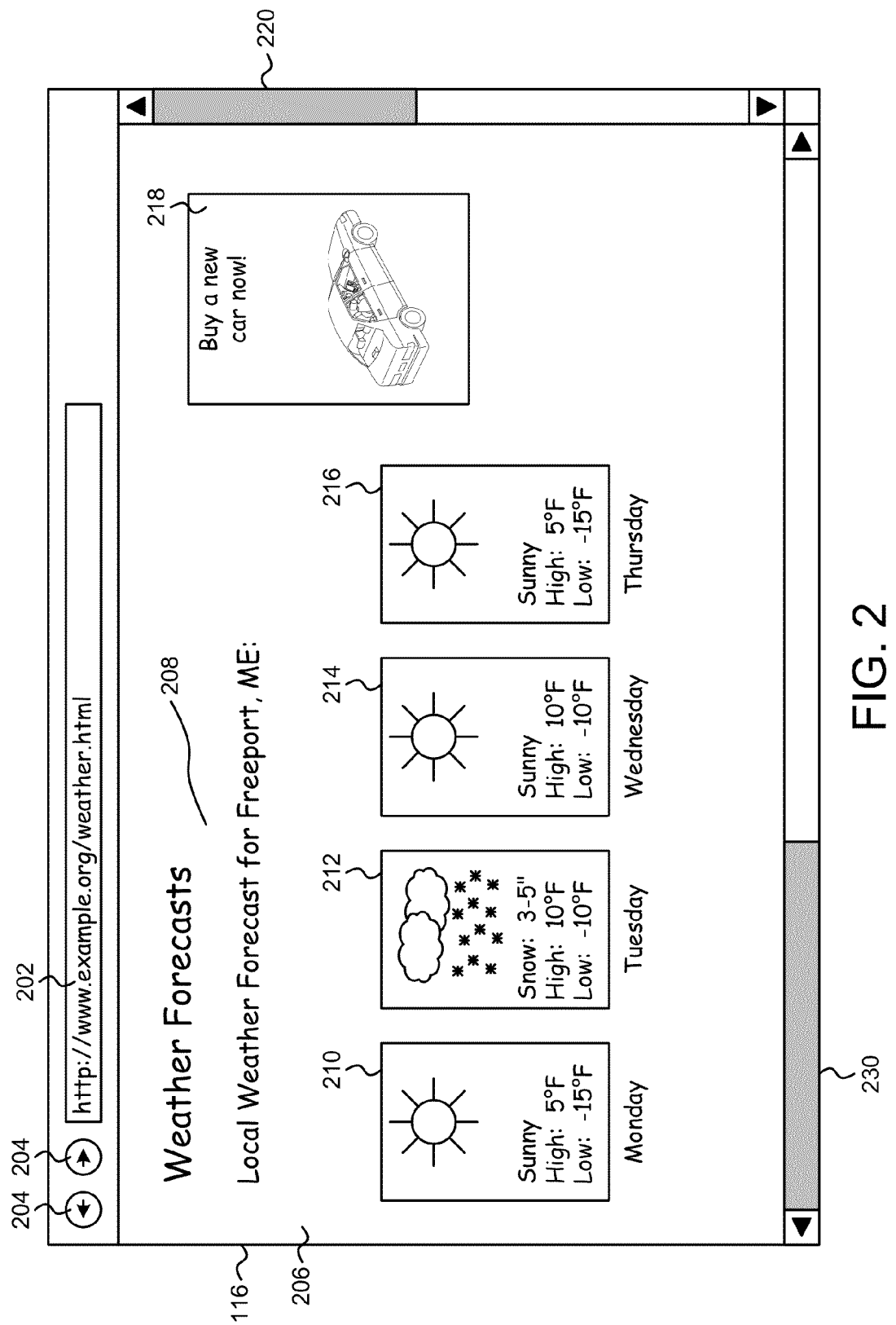
FIG. 2 is an illustration of an electronic display showing an example web page.

Referring now to FIG. 2, an illustration is shown of electronic display 116 displaying an example web page 206. Electronic display 116 is in electronic communication with processor 112 which causes visual indicia to be displayed on electronic display 116. For example, processor 112 may execute a web browser or other application stored in memory 114 of client 102 to display indicia of content received by client 102 via network 106. In various implementations, electronic display 116 may be located inside or outside of the same housing as that of processor 112 and/or memory 114. For example, electronic display 116 may be an external display, such as a computer monitor, television set, or any other stand-alone form of electronic display. In other examples, electronic display 116 may be integrated into the housing of a laptop computer, mobile device, or other form of computing device having an integrated display.

As shown, processor 112 may execute a web browser application and provide display data to electronic display 116. In one implementation, the web browser application may operate by receiving input of a uniform resource locator (URL) via a field 202, from an input device (e.g., a pointing device, a keyboard, a touchscreen, etc.). For example, the URL, http://www.example.org/weather.html, may be entered into field 202. Processor 112 may use the inputted URL to request data from a content source having a network address that corresponds to the entered URL. In response to the request, the content source may return web page data and/or other data to client 102 which may be used by client 102 to cause visual indicia to be displayed by electronic display 116.

In general, web page data may include text, hyperlinks, layout information, and other data that may be used to provide the framework for the visual layout of displayed web page 206. In some implementations, web page data may be one or more files of web page code written in a markup language, such as the hypertext markup language (HTML), extensible HTML (XHTML), extensible markup language (XML), or any other markup language. For example, the web page data in FIG. 2 may include a file, "weather.html" provided by the website, "www.example.org." The web page data may include data that specifies where indicia appear on web page 206, such as text 208. In some implementations, the web page data may also include additional URL information used by the client device to retrieve additional indicia displayed on web page 206. For example, the file, "weather.html," may also include one or more instructions used by processor 112 to retrieve images 210-216 from the content source.

The web browser displayed on electronic display 116 may include a number of navigational controls associated with web page 206. For example, the web browser may include the ability to go back or forward to other web pages using inputs 204 (e.g., a back button, a forward button, etc.). The web browser may also include one or more scroll bars 220, 230, which can be used to display parts of web page 206 that are currently off-screen. For example, web page 206 may be formatted to be larger than the screen of electronic display 116. In such a case, the one or more scroll bars 220, 230 may be used to change the vertical and/or horizontal position of web page 206 on electronic display 116.

Web page 206 may include text, images, or other forms of indicia to convey information to a user of client 102. For example, text 208 may indicate that web page 206 provides information about the weather forecast for Freeport, Me. Similarly, images 210-216 may provide information about the latest weather forecast. For example, image 210 may indicate that the weather is predicted to be sunny on Monday, while image 212 may indicate that snow is predicted for Tuesday. Any combination of text, images, and/or other files may be used by web page 206 to convey information to a user. For example, the weather forecast for Tuesday may be conveyed via text, instead of via image 212.

In one implementation, web page 206 may be configured to include content 218 selected based on a user identifier associated with client 102. In other words, web page 206 may include content 218 when visited by client 102 and different content when visited by another device. In some implementations, one or more content tags may be embedded into the web page code located in the file "weather.html" and/or in other files of web page 206. For example, "weather.html" may include a content tag that specifies that a content field is to be located at the position of content 218. Another content tag may cause processor 112 to request content when web page 206 is loaded from similarity evaluator 104. Such a request may include one or more keywords, a client identifier for client 102, or other data used by similarity evaluator 104 to select content to provide to client 102 and in conjunction with web page 206. In response, similarity evaluator 104 may select content 218. In some cases, similarity evaluator 104 may provide content 218 to client 102. In other cases, similarity evaluator 104 may send a command to client 102 that causes client 102 to retrieve content 218 from a local memory or from a networked content source. In this way, different content may be placed in the location of content 218 on web page 206, based on the device visiting web page 206.

Figure 3:
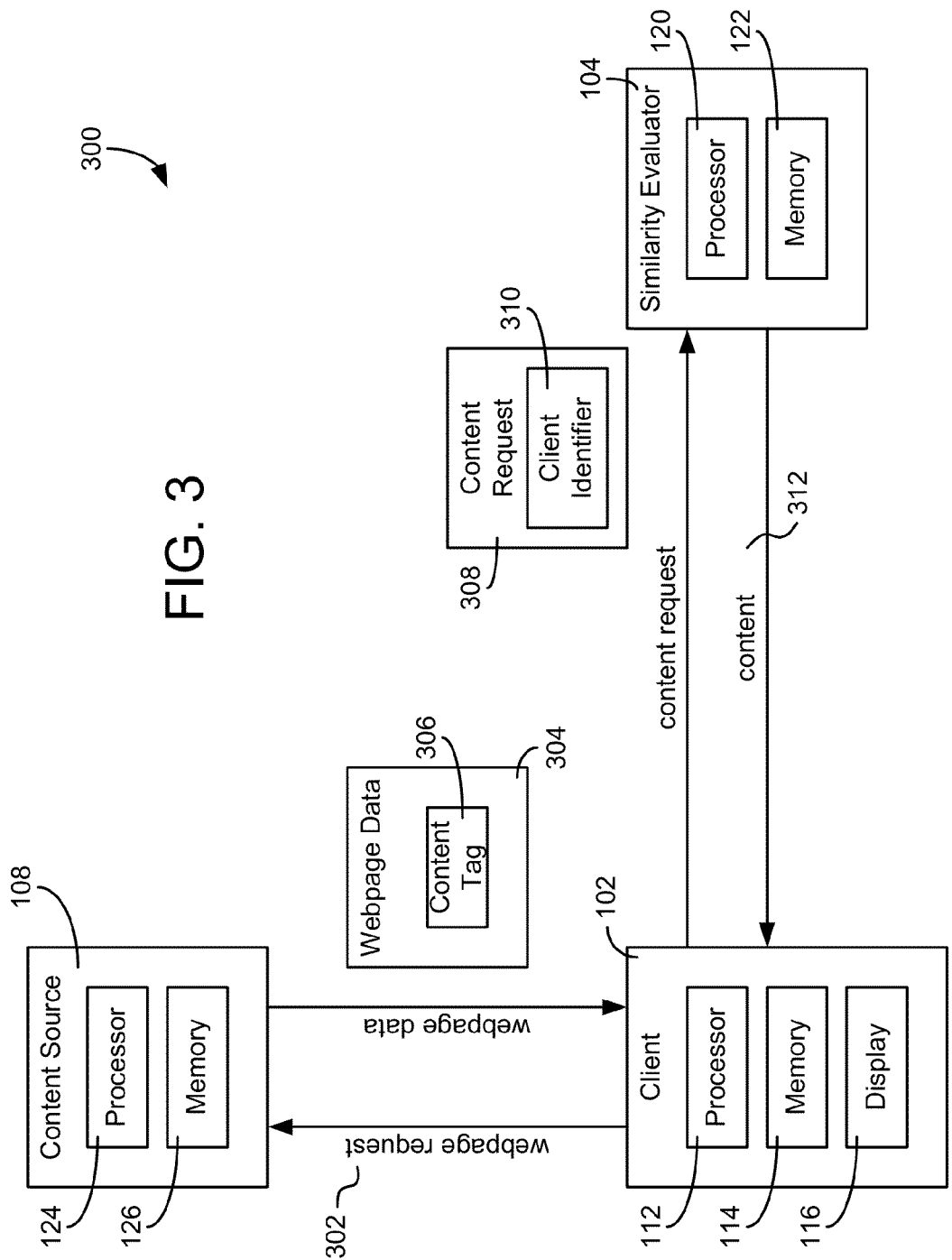
FIG. 3 is an example illustration of content being included on a web page by a similarity evaluator.

FIG. 3 is an example illustration of content 312 being selected by similarity evaluator 104 for inclusion with a web page by a process 300. As shown, client 102 may send a web page request 302 to a content source via network 106, such as content source 108. For example, web page request 302 may be a request that conforms to the hypertext transfer protocol (HTTP), such as the following:
GET /weather.html HTTP/1.1
Host: www.example.org
Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with web page request 302 to identify client 102 to content source 108.

In response to receiving web page request 302, content source 108 may return web page data 304, such as the requested file, "weather.html." Web page data 304 may be configured to cause client 102 to display a web page on electronic display 116 when opened by a web browser application. In some cases, web page data 304 may include code that causes client 102 to request additional files to be used as part of the displayed web page. For example, web page data 304 may include an HTML image tag of the form:
<img src="Monday_forecast.jpg">
Such code may cause client 102 to request the image file "Monday_forecast.jpg," from content source 108.

In some implementations, web page data 304 may include content tag 306 configured to cause client 102 to retrieve content from similarity evaluator 104. In some cases, content tag 306 may be an HTML image tag that includes the network location of similarity evaluator 104. In other cases, content tag 306 may be implemented using a client-side scripting language, such as JavaScript. For example, content tag 306 may be of the form:
<script type='text/javascript'>
ContentNetwork_RetrieveContent("argument")
</script>
where ContentNetwork_RetrieveContent is a script function that causes client 102 to send a content request 308 to similarity evaluator 104. In some cases, the argument of the script function may include the network address of similarity evaluator 104, the referring web page, and/or additional information that may be used by similarity evaluator 104 to select content to be included with the web page.

According to various implementations, the user of client 102 may opt in to receiving content determined to be relevant to the user. In such a case, content request 308 may include a client identifier 310, used by similarity evaluator 104 to identify client 102 and/or a user identifier associated with client 102. In various implementations, client identifier 310 may be an HTTP cookie previously set by similarity evaluator 104 on client 102, the IP address of client 102, a unique device serial number for client 102, other forms of identification information, or combinations thereof. For example, similarity evaluator 104 may set a cookie that includes a unique string of characters on client 102 when content is first requested by client 102 from similarity evaluator 104. Such a cookie may be included in subsequent content requests sent to similarity evaluator 104 by client 102.

In some implementations, client identifier 310 may be used by similarity evaluator 104 to store signal data indicative of online actions performed using client 102. For example, content request 308 may include data relating to which web page was requested by client 102, when the web page was requested, and/or other browsing history data. In this way, similarity evaluator 104 is able to reconstruct at least a portion of the online history of client 102. In some implementations, similarity evaluator 104 may also receive signal data from other entities that do not include content selected by similarity evaluator 104. For example, a website that does include content from similarity evaluator 104 may nonetheless provide information about client 102 visiting the website to similarity evaluator 104.

In some cases, client identifier 310 may be sent to similarity evaluator 104 when the user of client 102 performs certain online actions. For example, web page data 304 may include a tag that causes client 102 to send client identifier 310 to similarity evaluator 104 when the user selects displayed content. Client identifier 310 may also be used to store information about client 102 being redirected to another web page. For example, client 102 may be redirected to a content provider's website if the user selects displayed content. In such a case, client identifier 310 may also be used to record which actions were performed on the content provider's website. For example, client identifier 310 may be sent to similarity evaluator 104 when the user of client 102 navigates the content provider's website. In this way, data regarding whether the user searched for a product, added a product to a shopping cart, completed a purchase on the content provider's website, etc., may also be stored by similarity evaluator 104.

Similarity evaluator 104 may use signal data for the user identifier associated with client 102 to determine how similar the user identifier is to a set of one or more other user identifiers. In various implementations, similarity evaluator 104 may use statistical analysis on signal data associated with the set to determine the strength of association between a signal and the set. For example, if 85% of user identifiers in the set visited a particular web page, this signal may be weighted highly. Similarity evaluator 104 may apply signal weights to the signals for the user identifier associated with client 102. The signal weights may then be used to determine a measure of similarity between the user identifier associated with client 102 and that of the set.

In response to receiving content request 308, similarity evaluator 104 may select content 312 to be returned to client 102 based on the similarity score for its associated user identifier. In some implementations, a content provider may participate in an auction to provide content to client 102. For example, a content provider may specify a set of one or more user identifiers and utilize similarity evaluator 104 to determine how similar the set is to that of the user identifier for client 102. If an auction process is used by similarity evaluator 104 to select content for client 102, the content provider's bid in the auction may be based on the determined similarity score. For example, assume that the set of user identifiers specified by the content provider is associated with buying a particular product. If the signals for the user identifier associated with client 102 are similar to that of the set, the content provider may bid in an auction to provide content 312, e.g. an advertisement, to client 102.

Figure 4:
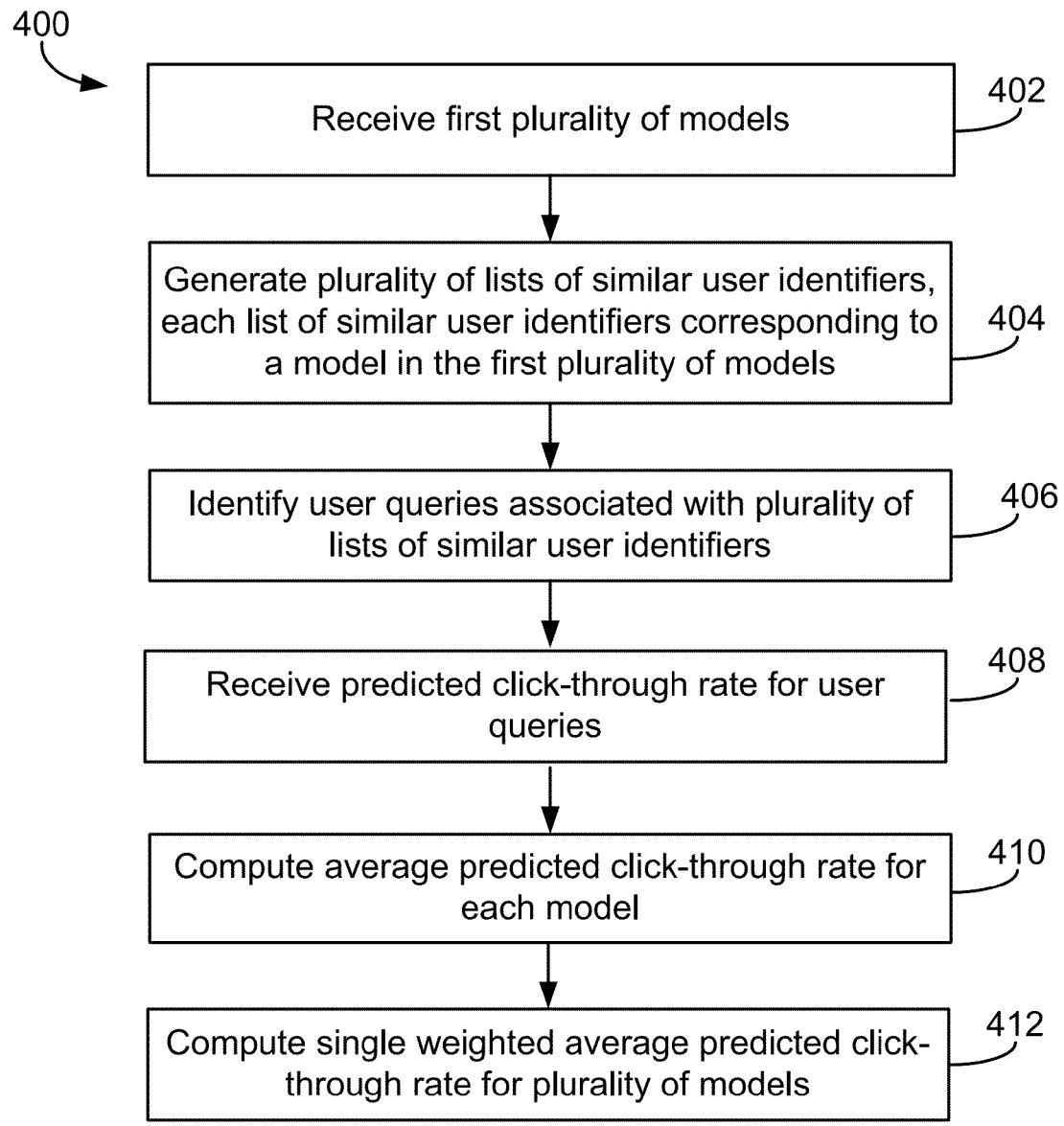
FIG. 4 is an example process for computing a weighted averaged predicted click-through rate for several models in order to compare algorithms used to generate the models.

In some implementations, as illustrated in FIG. 4, the processing circuit performs process 400 for selecting an algorithm for generating models configured to identify similar user identifiers. Process 400 may be implemented by a content server or other computing device having access to some or all of a user identifier's history data.

When evaluating the success of an algorithm used to generate a model configured to identify similar user identifiers, the content network may perform live experiments. In these live experiments, the content network displays content to user identifiers on the remarketing list provided by a content provider, as well as user identifiers on a list of similar user identifiers generated by a model. The content network then observes an actual click-through rate of the user identifiers on the list of similar user identifiers to gauge if the model is successful at identifying similar user identifiers that are likely to lead to conversions or if the model needs to be improved. In general, a conversion refers to a user, corresponding to a user identifier, performing a certain action. For example, a converting user may be a user identifier who clicked on content and was considered valuable because the user identifier spent significant time on a web page, purchased a good or service, created a user profile on a web page, subscribed to receive marketing offers, downloaded software from a web page or any other action that may be performed online that is visible to the content provider and deemed to be a valuable parameter by the content provider.

The live experiments are only conducted on a small fraction of the total traffic in a content network because the content displayed to the user identifiers on the list of similar user identifiers must compete with content from other targeting criteria (e.g. contextual targeted advertisements) to be displayed to the user identifier. Only a limited quantity of content, for example five to eight advertisements, are displayed to a given user identifier per user query. Therefore, limited information is available regarding the success of the algorithm because the actual click-through rate of the user identifiers on the list of similar user identifiers is low.

Hence, it is advantageous to use a predicted click-through rate to evaluate the success of the identification process because the predicted click-through rate does not require the content to be displayed to or clicked on by the user identifiers on the list of similar user identifiers. Therefore, information about the success of the identification process can be acquired without having to beat other content in an auction process. In addition, since the amount of predicted click-through rate data exceeds the actual click-through rate data, the content network can complete the evaluation in a shorter time and with better accuracy.

Process 400 includes receiving, at the processing circuit, several different models (block 402). Each model is generated by a first algorithm (e.g. Algorithm A) and is individually configured to receive a first list of user identifiers and a list of candidate similar user identifiers that do not appear on the first list of user identifiers (e.g., a pool of user identifiers, existing in the content network, that may or may not be similar user identifiers), and to generate a list of similar user identifiers based on the first list of user identifiers. Information contained in the models can be manually compiled and loaded into the system memory or automatically obtained from a program that tracks internet browsing activity for user identifiers that allow such tracking. The several different models can include any number of models. Any type of model can be used.

Each of the several different models includes feature data and corresponding weights. Feature data may include, but are not limited to, web pages visited, topics in the web pages, salient keywords in the web pages, content displayed on the web pages, content clicked on, search terms entered for searches performed, products purchased, users' geography, users' demography, etc. The corresponding weights are fixed within each model and relate to a weight each feature data of the model is given.

Process 400 further includes generating several lists of similar user identifiers (block 404). In some implementations, each list of similar user identifiers corresponds to one of the several different models. The several lists of similar user identifiers are generated by a process similar to that described above involving similarity evaluator 104.

Next, process 400 includes identifying user queries associated with user identifiers on the several lists of similar user identifiers (block 406). A "user query" may refer to an occurrence in which a user identifier opens a web page and invokes a computation for selecting content to be displayed to the user identifier (e.g., on a search results page, on a content page, etc.).

Process 400 also includes receiving a predicted click-through rate for the user queries associated with the user identifiers on the several lists of similar user identifiers (block 408). The predicted click-through rate represents the click-through rate content may have in the future if displayed on a given web page. The predicted click-through rate may be determined by comparing the click-through rate of several similar content displayed on a given web page or web pages with similar content. Similarity may be determined in various ways, including, for example, overlapping keywords, product category, content, market, etc.

For each user query, there is a predicted click-through rate. The predicted click-through rate is refreshed at a dynamic frequency, every time the content network receives a user query. The predicted click-through rate is attributed to a list of user identifiers if the content network identifies the list as one of the several lists of similar user identifiers. In some implementations, a single user query, and therefore, a predicted click-through rate, may be associated with multiple lists in the several lists of similar user identifiers if a user identifier appears on more than one list.

Then, process 400 includes computing an average predicted click-through rate for each model based in part on the predicted-click through rates for user identifiers on the list of similar user identifiers associated with each model (block 410). Any type of average may be computed, including, but not limited to, arithmetic mean, geometric mean, harmonic mean, etc.

Based in part on the average predicted click-through rate, the feature data and corresponding weights for each model, process 400 includes computing a single, weighted average predicted click-through rate for the several different models generated by the first algorithm (block 412). In some implementations, the computation of the weighted average predicted click-through rate is based in part on a size of the list of similar user identifiers (i.e. a total number of user identifiers that are similar to a pre-existing list associated with a model) and a level of traffic associated with the list of similar user identifiers (i.e. a total number of queries associated with the similar user identifiers). These factors are exemplary. Other factors may impact the computation of the weighted average predicted click-through rate.

Figure 5:
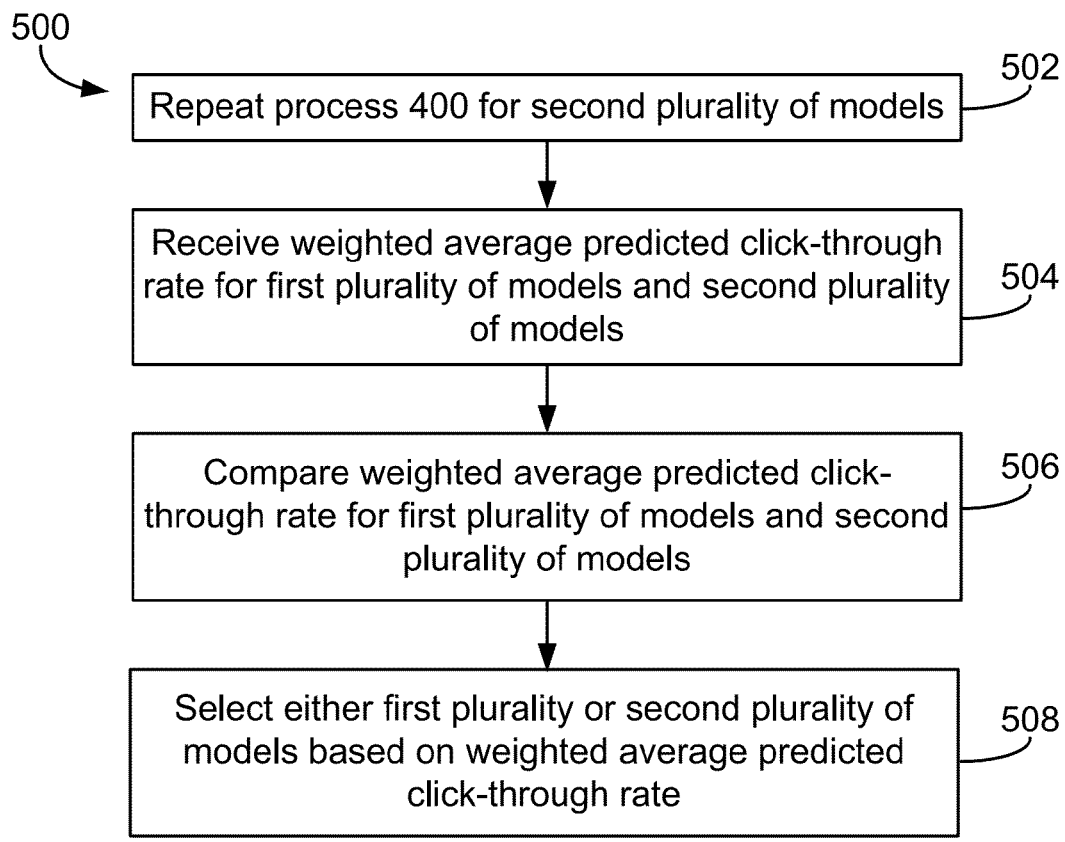
FIG. 5 is an example process for selecting an algorithm for generating models configured to identify similar user identifiers.

In some implementations, as illustrated in FIG. 5, the processing circuit performs process 500 for comparing two algorithms used to generate models. Process 500 may be implemented by a content server or other computing device having access to some or all of a user identifier's history data. Although only two algorithms are compared in the exemplary illustration, any number of algorithms can be compared in a process similar to process 500.

Process 500 includes repeating process 400 for several different models generated by a second algorithm (e.g. Algorithm B) (block 502). Process 500 also includes receiving the weighted average predicted click-through rate for the several different models generated by the first algorithm and a weighted average predicted click-through rate for the several different models generated by the second algorithm (block 504).

Next, process 500 includes comparing the weighted average predicted click-through rate for models generated by the first algorithm and the weighted average predicted click-through rate for models generated by the second algorithm (block 506). The algorithm associated with a higher weighted average predicted click-through rate is selected as the more successful algorithm (block 508). In other words, if the predicted click-through rate is high, the model configured to generate a list of similar user identifiers is successful at identifying similar user identifiers that are likely to lead to conversions. The selected algorithm may be used to generate any subsequent models related to the remarketing list or advertising category.

Figure 6:
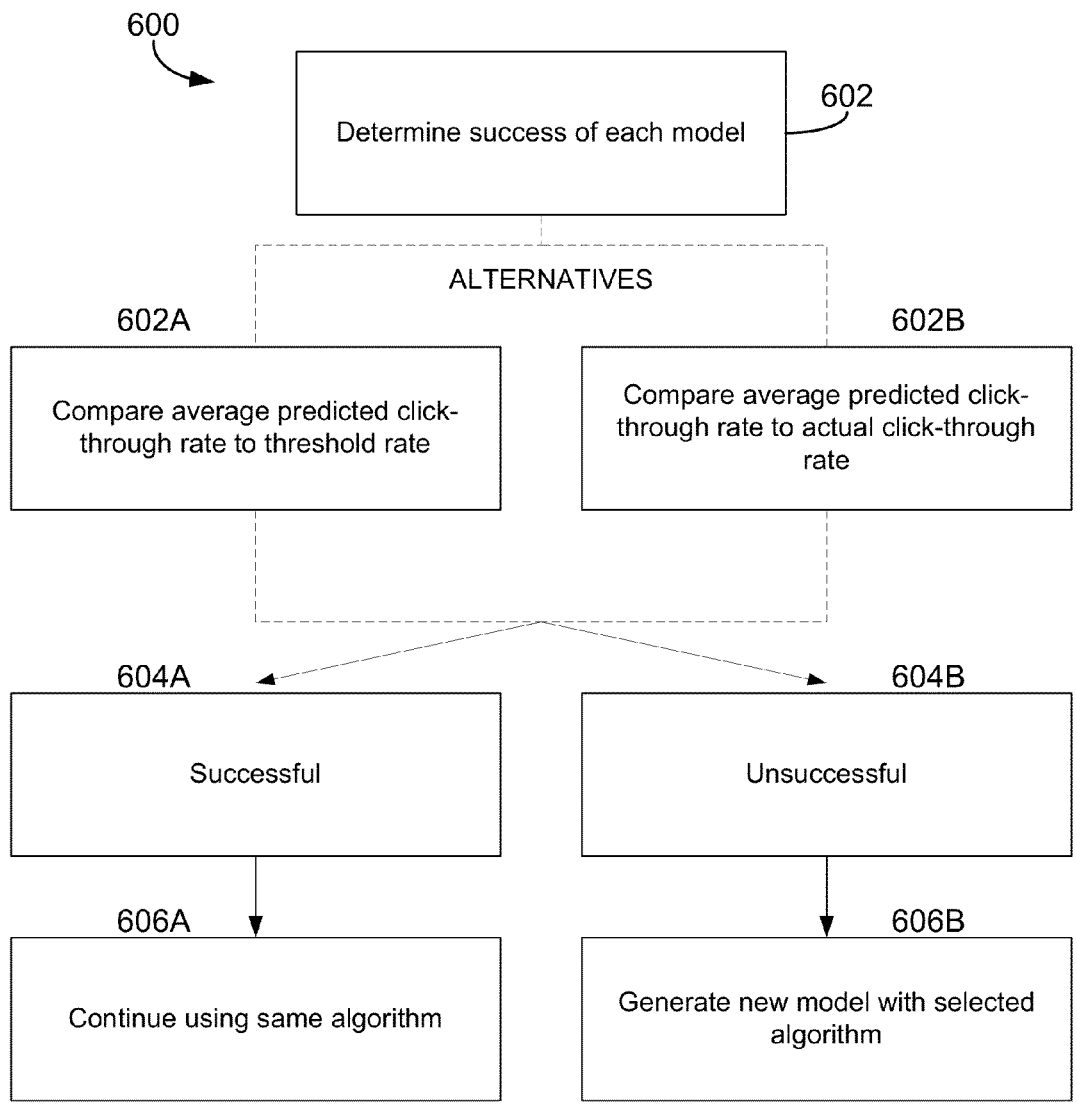
FIG. 6 is an example process for determining a level of success of each model.

In some implementations, as illustrated in FIG. 6, the processing circuit performs process 600 for determining a level of success of each model. Process 600 may be implemented by a content server or other computing device having access to some or all of a user identifier's history data.

Process 600 includes determining a level of success of each model (block 602). In some implementations, the level of success of a model is determined by comparing the average predicted click-through rate of the model to a threshold rate (block 602A). The threshold rate may be a default rate applied to all content campaigns processed by the content network. The default threshold rate may be adjusted by the content network depending on the needs of each advertiser. If the average predicted click-through rate for a model meets or exceeds the threshold rate, the model is deemed successful (block 604A). If the average predicted click-through rate for the model is less than the threshold value, the model is deemed unsuccessful (block 604B).

In other implementations, the level of success of a model is determined by comparing the average predicted click-through rate of the model to an actual click-through rate of the model (block 602B). If a difference between the average predicted-click through rate for the model and the actual click-through rate of the model is less than or equal to a threshold value, the model is deemed successful (block 604A). If the difference between the average predicted-click through rate for the model and the actual click-through rate of the model exceeds the threshold value, the model is deemed unsuccessful (block 604B).

Based on the determination of success of the model, process 600 may include further action by the content network. In some implementations, if the model is deemed successful, the content network may continue using the algorithm used to generate that model to create additional models configured to identify similar network user identifiers (block 606A). In other implementations, if the model is deemed unsuccessful, the content network may generate a new model by the algorithm selected in block 508 of process 500 to replace the unsuccessful model (block 606B).

Thus, by using predicted click-through rate to evaluate the success of a model in identifying similar user identifiers, the content network can complete the evaluation in a shorter time and with better accuracy.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of selecting an algorithm for generating models configured to identify similar user identifiers, the method comprising:
   receiving, at a processing circuit, a first plurality of models, each model generated by a first algorithm and configured to generate a list of similar user identifiers based on a first list of user identifiers;
   generating, by the processing circuit, a plurality of lists of similar user identifiers, each list of similar user identifiers corresponding to a model in the first plurality of models;
   identifying, by the processing circuit, user queries associated with user identifiers on the plurality of lists of similar user identifiers, wherein a user query is an invocation of a computation regarding content to be displayed when a user identifier opens a web page;
   receiving, by the processing circuit, predicted click-through rates for the user queries associated with the user identifiers on the list of similar user identifiers associated with each model;
   computing, by the processing circuit, an average predicted click-through rate for each model based in part on the predicted click-through rates for user identifiers on the list of similar user identifiers associated with each model; and
   computing, by the processing circuit, a single weighted average predicted click-through rate associated with the first plurality of models generated by the first algorithm.

2. The method of claim 1, further comprising:
   receiving, by the processing circuit, a single weighted average predicted click-through rate associated with a second plurality of models generated by a second algorithm;
   comparing, by the processing circuit, the weighted average predicted click-through rate associated with the first plurality of models generated by the first algorithm with the weighted average predicted click-through rate associated with the second plurality of models generated by the second algorithm; and
   selecting, by the processing circuit, either the first algorithm or the second algorithm for use in generating additional models based on the first and second weighted average predicted click-through rate.

3. The method of claim 1, further comprising determining, by the processing circuit, a level of success of each model,
   wherein if the average predicted click-through rate for a model meets or exceeds a threshold value, the model is successful, and
   wherein if the average predicted click-through rate for the model is less than the threshold value, the model is unsuccessful.

4. The method of claim 1, further comprising replacing each unsuccessful model with a model generated by the selected algorithm.

5. The method of claim 1, further comprising:
   calculating, by the processing circuit, an actual click-through rate for each model;
   comparing, by the processing circuit, the average predicted click-through rate for each model to the actual click-through rate for each model; and
   determining, by the processing circuit, a level of success for each model, wherein if a difference between the actual click-through rate for each model and the average predicted-click through rate for each model exceeds a threshold value, the model is unsuccessful.

6. The method of claim 5, further comprising replacing each unsuccessful model with a model generated by the selected algorithm.

7. The method of claim 1, further comprising generating display data configured to display at least one list of similar user identifiers on a user interface.

8. A system for selecting an algorithm for generating models configured to identify similar user identifiers comprising a processing circuit operable to:
   receive a first plurality of models, each model generated by a first algorithm and configured to generate a list of similar user identifiers based on a first list of user identifiers;
   generate a plurality of lists of similar user identifiers, each list of similar user identifiers corresponding to a model in the first plurality of models;
   identify user queries associated with user identifiers on the plurality of lists of similar user identifiers, wherein a user query is an invocation of a computation regarding content to be displayed when a user identifier opens a web page;
   receive predicted click-through rates for the user queries associated with the user identifiers on the list of similar user identifiers associated with each model;
   compute an average predicted click-through rate for each model based in part on the predicted click-through rates for user identifiers on the list of similar user identifiers associated with each model; and compute a single weighted average predicted click-through rate associated with the first plurality of models generated by the first algorithm.

9. The system of claim 8, wherein the processing circuit is further operable to:
receive a single weighted average predicted click-through rate associated with a second plurality of models generated by a second algorithm;
compare the weighted average predicted click-through rate associated with the first plurality of models generated by the first algorithm with the weighted average predicted click-through rate associated with the second plurality of models generated by the second algorithm; and
select either the first algorithm or the second algorithm for use in generating additional models based on the first and second weighted average predicted click-through rate.

10. The system of claim 8, wherein the processing circuit is further operable to determine a level of success of each model,
wherein if the average predicted click-through rate for a model meets or exceeds a threshold value, the model is successful, and
wherein if the average predicted click-through rate for the model is less than the threshold value, the model is unsuccessful.

11. The system of claim 10, wherein the processing circuit is further operable to replace each unsuccessful model with a model generated by the selected algorithm.

12. The system of claim 8, wherein the processing circuit is further operable to:
calculate an actual click-through rate for each model;
compare the average predicted click-through rate for each model to the actual click-through rate for each model; and
determine a level of success for each model, wherein if a difference between the actual click-through rate for each model and the average predicted-click through rate for each model exceeds a threshold value, the model is unsuccessful.

13. The system of claim 12, wherein the processing circuit is further operable to replace each unsuccessful model with a model generated by the selected algorithm.

14. The system of claim 8, wherein the processing circuit is further operable to generate generating display data configured to display at least one list of similar user identifiers on a user interface.

15. A computer-readable storage medium having instructions thereon that cause one or more processors to perform operations, the operations comprising:
receiving a first plurality of models, each model generated by a first algorithm and configured to generate a list of similar user identifiers based on a first list of user identifiers;
generating a plurality of lists of similar user identifiers, each list of similar user identifiers corresponding to a model in the first plurality of models;
identifying user queries associated with user identifiers on the plurality of lists of similar user identifiers, wherein a user query is an invocation of a computation regarding content to be displayed when a user identifier opens a web page;
receiving predicted click-through rates for the user queries associated with the user identifiers on the list of similar user identifiers associated with each model;
computing an average predicted click-through rate for each model based in part on the predicted click-through rates for user identifiers on the list of similar user identifiers associated with each model; and
computing a single weighted average predicted click-through rate associated with the first plurality of models generated by the first algorithm.

16. The computer-readable storage medium of claim 15, wherein the operations further comprise:
receiving a single weighted average predicted click-through rate associated with a second plurality of models generated by a second algorithm;
comparing the weighted average predicted click-through rate associated with the first plurality of models generated by the first algorithm with the weighted average predicted click-through rate associated with the second plurality of models generated by the second algorithm; and
selecting either the first algorithm or the second algorithm for use in generating additional models based on the first and second weighted average predicted click-through rate.

17. The computer-readable storage medium of claim 15, wherein the operations further comprise determining a level of success of each model,
wherein if the average predicted click-through rate for a model meets or exceeds a threshold value, the model is successful, and
wherein if the average predicted click-through rate for the model is less than the threshold value, the model is unsuccessful.

18. The computer-readable storage medium of claim 17, wherein the operations further comprise replacing each unsuccessful model with a model generated by the selected algorithm.

19. The computer-readable storage medium of claim 15, wherein the operations further comprise:
calculating an actual click-through rate for each model;
comparing the average predicted click-through rate for each model to the actual click-through rate for each model; and
determining a level of success for each model, wherein if a difference between the actual click-through rate for each model and the average predicted-click through rate for each model exceeds a threshold value, the model is unsuccessful.

20. The computer-readable storage medium of claim 19, wherein the operations further comprise replacing each unsuccessful model with a model generated by the selected algorithm.

21. The computer-readable storage medium of claim 15, wherein the operations further comprise generating display data configured to display at least one list of similar user identifiers on a user interface.

* * * * *